United States Patent
Wang et al.

(10) Patent No.: US 9,759,981 B2
(45) Date of Patent: Sep. 12, 2017

(54) COLOR DISPLAY DEVICE

(71) Applicant: E INK CALIFORNIA, LLC, Fremont, CA (US)

(72) Inventors: Ming Wang, Fremont, CA (US); Peter B. Laxton, Marshfield, MA (US); Yu Li, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/419,391

(22) Filed: Jan. 30, 2017

(65) Prior Publication Data

US 2017/0139304 A1    May 18, 2017

Related U.S. Application Data

(63) Continuation of application No. 14/242,793, filed on Apr. 1, 2014, now abandoned.

(60) Provisional application No. 61/955,129, filed on Mar. 18, 2014.

(51) Int. Cl.
   *G02F 1/167*    (2006.01)

(52) U.S. Cl.
   CPC ...... *G02F 1/167* (2013.01); *G02F 2001/1678* (2013.01); *G02F 2202/32* (2013.01); *G02F 2203/34* (2013.01)

(58) Field of Classification Search
   CPC .................................................. G02F 1/167
   See application file for complete search history.

(56) References Cited

U.S. PATENT DOCUMENTS

| | | | |
|---|---|---|---|
| 3,756,693 | A | 9/1973 | Ota |
| 3,892,568 | A | 7/1975 | Ota |
| 4,298,448 | A | 11/1981 | Muller et al. |
| 5,378,574 | A | 1/1995 | Winnik et al. |
| 5,980,719 | A | 11/1999 | Cherukuri et al. |
| 6,198,809 | B1 | 3/2001 | DiSanto et al. |
| 6,337,761 | B1 | 1/2002 | Rogers et al. |
| 6,373,461 | B1 | 4/2002 | Hasegawa et al. |
| 6,486,866 | B1 | 11/2002 | Kuwahara et al. |
| 6,517,618 | B2 | 2/2003 | Foucher et al. |
| 6,525,866 | B1 | 2/2003 | Lin et al. |
| 6,538,801 | B2 | 3/2003 | Jacobson |
| 6,600,534 | B1 | 7/2003 | Tanaka et al. |
| 6,650,462 | B2 | 11/2003 | Katase |

(Continued)

FOREIGN PATENT DOCUMENTS

| | | |
|---|---|---|
| JP | 2009116041 | 5/2009 |
| JP | 2009192637 | 8/2009 |

(Continued)

OTHER PUBLICATIONS

Nanobrick Co., Ltd, company website cover information, http://nanobrick.co.kr/, copied on Jun. 19, 2014.

*Primary Examiner* — Joseph P Martinez
(74) *Attorney, Agent, or Firm* — David J. Cole

(57) ABSTRACT

The present invention provides a reflective color display device which can display multiple color states, without the disadvantages associated with previously known color display devices. The display fluid of the present invention comprises (a) black and white electrophoretic particles which are oppositely charged and (b) charged color-generating particles having photonic crystal characteristics, all of which are dispersed in a solvent or solvent mixture.

17 Claims, 8 Drawing Sheets

First Color State (c)

(e) Second Color State (f) Third Color State

(56) References Cited

U.S. PATENT DOCUMENTS

| | | |
|---|---|---|
| 6,680,726 B2 | 1/2004 | Gordon, II et al. |
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,829,078 B2 | 12/2004 | Liang et al. |
| 6,864,875 B2 | 3/2005 | Drzaic et al. |
| 6,947,203 B2 | 9/2005 | Kanbe |
| 6,967,762 B2 | 11/2005 | Machida et al. |
| 6,987,503 B2 | 1/2006 | Inoue |
| 6,987,605 B2 | 1/2006 | Liang et al. |
| 7,009,756 B2 | 3/2006 | Kishi et al. |
| 7,019,889 B2 | 3/2006 | Katase |
| 7,034,987 B2 | 4/2006 | Schlangen |
| 7,038,655 B2 | 5/2006 | Herb et al. |
| 7,038,656 B2 | 5/2006 | Liang et al. |
| 7,046,228 B2 | 5/2006 | Liang et al. |
| 7,050,218 B2 | 5/2006 | Kanbe |
| 7,057,600 B2 | 6/2006 | Goden |
| 7,057,798 B2 | 6/2006 | Ukigaya |
| 7,075,502 B1 | 7/2006 | Drzaic et al. |
| 7,116,466 B2 | 10/2006 | Whitesides et al. |
| 7,226,550 B2 | 6/2007 | Hou et al. |
| 7,259,744 B2 | 8/2007 | Arango et al. |
| 7,271,947 B2 | 9/2007 | Liang et al. |
| 7,283,119 B2 | 10/2007 | Kishi |
| 7,304,987 B1 | 12/2007 | James et al. |
| 7,312,916 B2 | 12/2007 | Pullen et al. |
| 7,342,556 B2 | 3/2008 | Oue et al. |
| 7,352,353 B2 | 4/2008 | Albert et al. |
| 7,365,732 B2 | 4/2008 | Matsuda et al. |
| 7,382,351 B2 | 6/2008 | Kishi |
| 7,411,719 B2 | 8/2008 | Paolini, Jr. et al. |
| 7,417,787 B2 | 8/2008 | Chopra et al. |
| 7,420,549 B2 | 9/2008 | Jacobson et al. |
| 7,474,295 B2 | 1/2009 | Matsuda |
| 7,492,505 B2 | 2/2009 | Liang et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,605,972 B2 | 10/2009 | Kawai et al. |
| 7,652,656 B2 | 1/2010 | Chopra et al. |
| 7,679,599 B2 | 3/2010 | Kawai |
| 7,686,463 B2 | 3/2010 | Goto |
| 7,760,419 B2 | 7/2010 | Lee |
| 7,782,292 B2 | 8/2010 | Miyasaka et al. |
| 7,800,813 B2 | 9/2010 | Wu et al. |
| 7,808,696 B2 | 10/2010 | Lee et al. |
| 7,821,702 B2 | 10/2010 | Liang et al. |
| 7,830,592 B1 | 11/2010 | Sprague et al. |
| 7,852,547 B2 | 12/2010 | Kim |
| 7,852,548 B2 | 12/2010 | Roh |
| 7,911,681 B2 | 3/2011 | Ikegami et al. |
| 7,982,941 B2 | 7/2011 | Lin et al. |
| 8,072,675 B2 | 12/2011 | Lin et al. |
| 8,089,686 B2 | 1/2012 | Addington et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,164,823 B2 | 4/2012 | Ikegami et al. |
| 8,169,690 B2 | 5/2012 | Lin et al. |
| 8,174,492 B2 | 5/2012 | Kim et al. |
| 8,237,892 B1 | 8/2012 | Sprague et al. |
| 8,238,022 B2 | 8/2012 | Joo et al. |
| 8,355,196 B2 | 1/2013 | Yan et al. |
| 8,395,836 B2 | 3/2013 | Lin |
| 8,422,116 B2 | 4/2013 | Sprague et al. |
| 8,466,852 B2 | 6/2013 | Drzaic et al. |
| 8,477,405 B2 | 7/2013 | Ishii et al. |
| 8,503,063 B2 | 8/2013 | Sprague |
| 8,520,296 B2 | 8/2013 | Wang et al. |
| 8,537,104 B2 | 9/2013 | Markvoort et al. |
| 8,570,272 B2 | 10/2013 | Hsieh et al. |
| 8,576,475 B2 | 11/2013 | Huang et al. |
| 8,605,354 B2 | 12/2013 | Zhang et al. |
| 8,649,084 B2 | 2/2014 | Wang et al. |
| 8,670,174 B2 | 3/2014 | Sprague et al. |
| 8,681,191 B2 | 3/2014 | Yang et al. |
| 8,704,756 B2 | 4/2014 | Lin |
| 8,717,664 B2 | 5/2014 | Wang et al. |
| 8,786,935 B2 | 7/2014 | Sprague |
| 8,797,258 B2 | 8/2014 | Sprague |
| 8,797,636 B2 | 8/2014 | Yang et al. |
| 8,810,899 B2 | 8/2014 | Sprague et al. |
| 8,917,439 B2 | 12/2014 | Wang et al. |
| 8,964,282 B2 | 2/2015 | Wang et al. |
| 8,976,444 B2 | 3/2015 | Zhang et al. |
| 9,013,783 B2 | 4/2015 | Sprague |
| 9,140,952 B2 | 9/2015 | Sprague et al. |
| 9,146,439 B2 | 9/2015 | Zhang |
| 9,170,468 B2 | 10/2015 | Lin et al. |
| 9,285,649 B2 | 3/2016 | Du et al. |
| 9,293,511 B2 | 3/2016 | Jacobson et al. |
| 9,360,733 B2 | 6/2016 | Wang et al. |
| 9,383,623 B2 | 7/2016 | Lin et al. |
| 9,459,510 B2 | 10/2016 | Lin |
| 9,460,666 B2 | 10/2016 | Sprague et al. |
| 9,513,527 B2 | 12/2016 | Chan et al. |
| 9,541,814 B2 | 1/2017 | Lin et al. |
| 2007/0002008 A1 | 1/2007 | Tam |
| 2007/0080928 A1 | 4/2007 | Ishii et al. |
| 2007/0273637 A1 | 11/2007 | Zhou et al. |
| 2008/0042928 A1* | 2/2008 | Schlangen ......... G09G 3/3446 345/55 |
| 2008/0062159 A1 | 3/2008 | Roh et al. |
| 2008/0174531 A1 | 7/2008 | Sah |
| 2011/0043543 A1 | 2/2011 | Chen et al. |
| 2011/0199671 A1 | 8/2011 | Amundson et al. |
| 2011/0217639 A1 | 9/2011 | Sprague |
| 2011/0234557 A1 | 9/2011 | Yang et al. |
| 2014/0011913 A1 | 1/2014 | Du et al. |
| 2014/0055840 A1 | 2/2014 | Zang et al. |
| 2014/0340430 A1 | 11/2014 | Telfer et al. |
| 2014/0362213 A1 | 12/2014 | Tseng |
| 2015/0103394 A1 | 4/2015 | Wang et al. |
| 2015/0268531 A1 | 9/2015 | Wang et al. |
| 2015/0301246 A1 | 10/2015 | Zang et al. |
| 2016/0011484 A1 | 1/2016 | Chan et al. |
| 2016/0026062 A1 | 1/2016 | Zhang |
| 2016/0048054 A1 | 2/2016 | Danner |
| 2016/0116816 A1 | 4/2016 | Paolini et al. |
| 2016/0116818 A1 | 4/2016 | Du et al. |
| 2016/0140909 A1 | 5/2016 | Lin et al. |

FOREIGN PATENT DOCUMENTS

| | | |
|---|---|---|
| KR | 1020070082680 | 8/2007 |
| WO | 9953373 | 10/1999 |

* cited by examiner

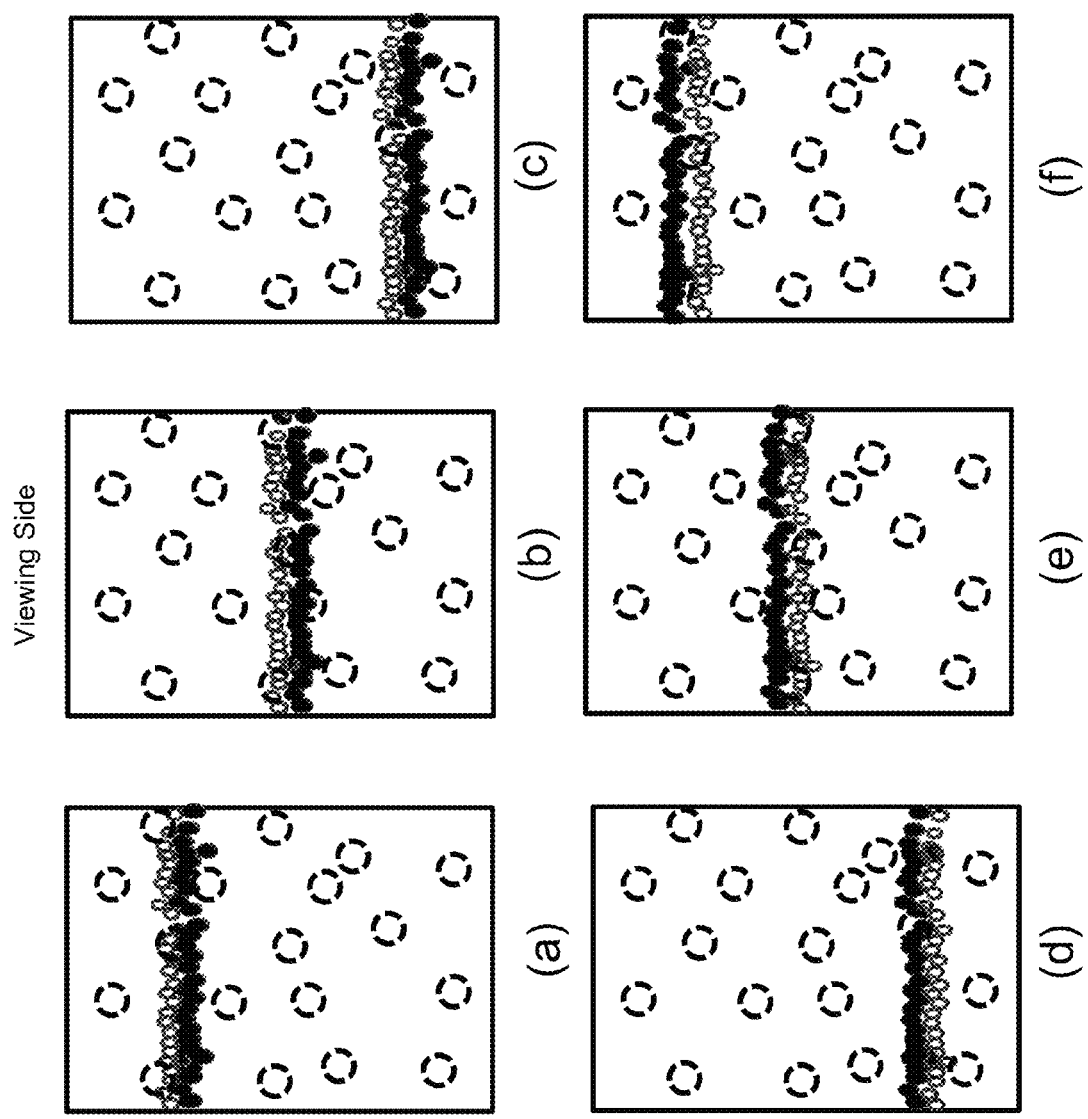

COLOR DISPLAY DEVICE

REFERENCE TO RELATED APPLICATIONS

This application is a continuation of copending application Ser. No. 14/242,793, filed Apr. 1, 2014 (Publication No. 2015/0268531), which claims benefit of U.S. Provisional Application Ser. No. 61/955,129, filed March 18, which is incorporated herein by reference in its entirety.

FIELD OF THE INVENTION

The present invention is directed to a color display device which can display high quality color states, and a display fluid for such a color display device.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third (⅓) of the desired white state, the white state is fairly dim. To compensate this, a fourth sub-pixel may be added which can display only the black and white states, so that the white level is doubled at the expense of the red, green or blue color level (where each sub-pixel is only one fourth (¼) of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

An alternative of color display device employs colored pigment particles, in addition to the black and white particles. This type of color display can display multiple color states by moving the black, white and colored particles to the viewing side. However, the number of the color states displayed is limited by how many types of different colored particles are in the display fluid and how well their movement can be controlled.

BRIEF DESCRIPTION OF THE DRAWINGS

FIGS. 2-1 to 2-5 illustrate how different color states may be displayed by the color display device of the present invention.

FIG. 3 demonstrates how locations of the black and white particles influence the intensity/brightness of the color displayed by the color-generating particles.

FIG. 4 demonstrates how mixing levels of the black and white particles influence the intensity/brightness of the color displayed by the color-generating particles.

SUMMARY OF THE INVENTION

Figure 1:
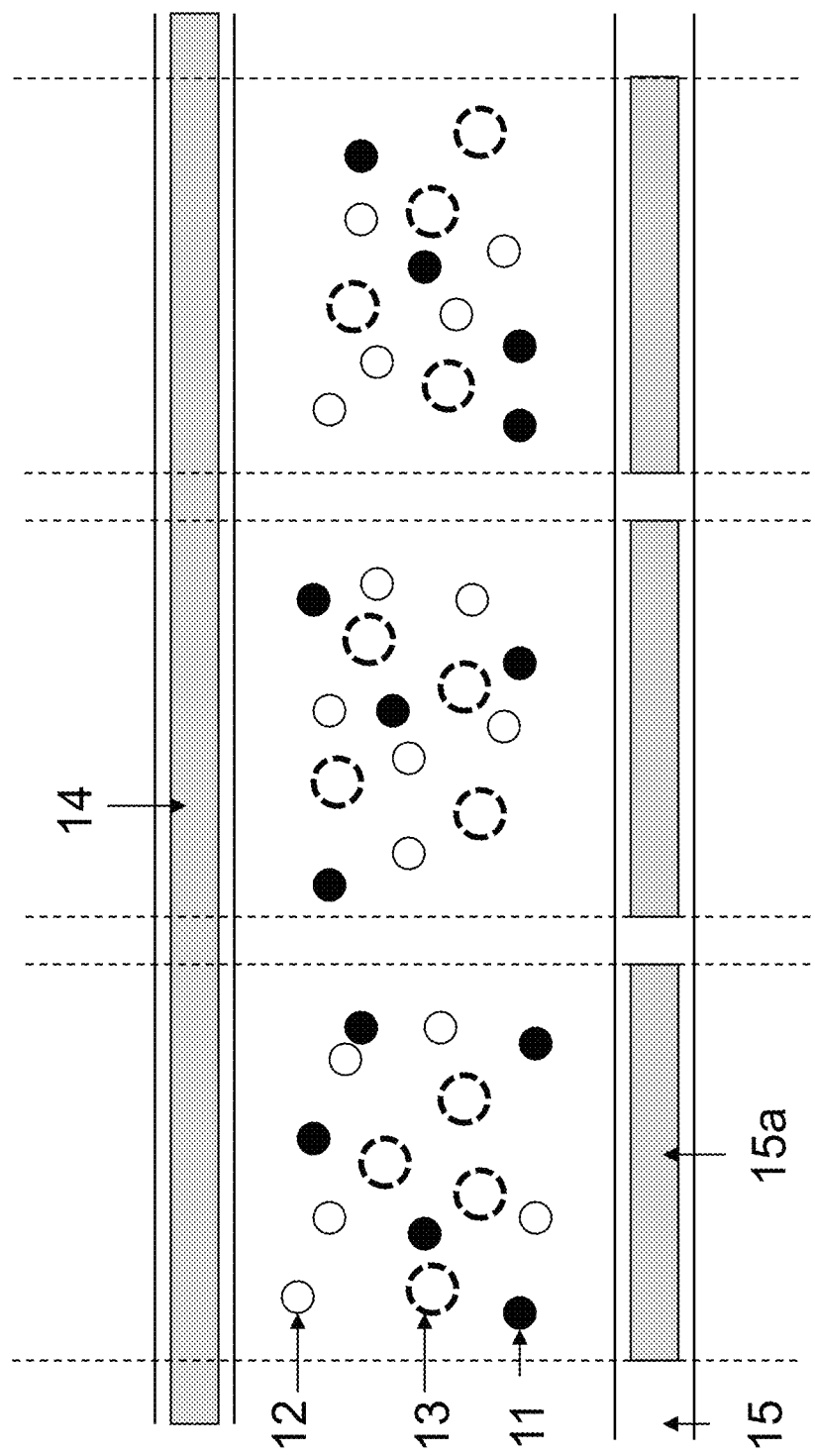
FIG. 1 illustrates a display fluid of the present invention.

The present invention is directed to a display fluid comprising
 (a) black and white electrophoretic particles which are oppositely charged, and
 (b) charged color-generating particles having photonic crystal characteristics, all of which are dispersed in a solvent or solvent mixture.

In one embodiment, all of the color-generating particles are either positively or negatively charged.

In one embodiment, the charged color-generating particles have electrical polarization characteristics. In one embodiment, the solvent or solvent mixture has electrical polarization characteristics. In one embodiment, both the color-generating particles and the solvent or solvent mixture have electrical polarization characteristics.

In one embodiment, the color-generating particles are formed of silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), or a compound thereof.

In one embodiment, the color-generating particles are formed of polymer materials such as PS (polystyrene), PE (polyethylene), PP (polypropylene), PVC (polyvinyl chloride), or PET (polyethylene terephthalate).

In one embodiment, the color-generating particles are formed by coating particles or a cluster having no electric charge with a material having electric charges.

In one embodiment, the color-generating particles include a material which is electrically polarized with any one of electronic polarization, ionic polarization, interfacial polarization or rotational polarization due to asymmetrical charge distribution of atoms or molecules as an external electric field is applied.

In one embodiment, the color-generating particles include a ferroelectric material.

In one embodiment, the color-generating particles include a superparaelectric material.

In one embodiment, the color-generating particles include a material having a perovskite structure.

In one embodiment, the solvent is water, trichloroethylene, carbon tetrachloride, di-iso-propyl ether, toluene, methyl-t-butyl ether, xylene, benzene, diethyl ether, dichloromethane, 1,2-dichloroethane, butyl acetate, iso-propanol, n-butanol, tetrahydrofuran, n-propanol, chloroform, ethyl acetate, 2-butanone, dioxane, acetone, methanol, ethanol, acetonitrile, acetic acid, dimethylformamide, dimethyl sulfoxide or propylene carbonate.

In one embodiment, the present invention is directed to a method for generating a full spectrum of colors, which method comprises applying an electric field to the display fluid of the present invention to control the inter-particle distances of the color-generating particles.

In one embodiment, the intensity of the colors displayed is controlled by adjusting locations of the black and white electrophoretic particles or mixing levels of the black and white particles.

DETAILED DESCRIPTION OF THE INVENTION

The present invention provides a reflective color display device which can display multiple color states, without the disadvantages associated with previously known color display devices.

The display fluid of the present invention, as shown in FIG. 1, comprises (a) black (11) and white (12) electrophoretic particles which are oppositely charged and (b) charged color-generating particles (13) having photonic crystal characteristics, all of which are dispersed in a solvent or solvent mixture. All the color-generating particles carry the same charge polarity, positive or negative.

The display fluid is sandwiched between two electrode layers. One of the electrode layers is a common electrode (14) which is a transparent electrode layer (e.g., ITO), spreading over the entire top of the display device. The other electrode layer (15) is a layer of pixel electrodes (15a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

The black electrophoretic particles (11) may be formed from CI pigment black 26 or 28 or the like (e.g., manganese ferrite black spinel or copper chromite black spinel) or carbon black.

The white electrophoretic particles (12) may be formed from an inorganic pigment, such as $TiO_2$, $ZrO_2$, ZnO, $Al_2O_3$, $Sb_2O_3$, $BaSO_4$, $PbSO_4$ or the like.

As stated, the black and white particles are oppositely charged. If the black particles are positively charged, then the white particles are negatively charged, or vice versa.

The percentages of the black and white particles in the fluid may vary. For example, the black electrophoretic particle may take up 0.1% to 10%, preferably 0.5% to 5%, by volume of the electrophoretic fluid; the white electrophoretic particle may take up 1% to 50%, preferably 5% to 20%, by volume of the fluid.

The size of the black and white particles in the fluid may vary. For example, both the black and white particle may have a size between 100 nm to 10 µm, preferably between 200 nm to 1 µm.

The charged color generating particles having photonic crystal characteristics are described in U.S. Pat. No. 8,238,022. Some of the description in U.S. Pat. No. 8,238,022 is quoted below. However, it is noted that the content of the entire patent is incorporated herein by reference.

The color generating particles are charged. They may have electrical polarization characteristics or the solvent may have electrical polarization characteristics or both may have electrical polarization characteristics. In any case, the inter-particle distances may be controlled by applying an electric field to the display fluid, thereby implementing a full spectrum of colors using the photonic crystal characteristics of the color-generating particles.

All of the color-generating particles carry the same charge polarity, either positive or negative. They may be arranged at predetermined spaces from each other by the repulsive force between them caused by electric charges of the same polarity.

The diameter of the color-generating particles may range from several nm to several hundred microns; but the particle diameter is not necessarily limited thereto.

As indicated in U.S. Pat. No. 8,238,022, the color-generating particles may be formed of elements, such as silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), or a compound thereof. In addition, the color-generating particles may be formed of polymer materials such as PS (polystyrene), PE (polyethylene), PP (polypropylene), PVC (polyvinyl chloride), or PET (polyethylene terephthalate).

Furthermore, the color-generating particles may be formed by coating particles or a cluster having no electric charge with a material having electric charges. Examples of these particles may include particles whose surfaces are processed (or coated) with an organic compound having a hydrocarbon group; particles whose surfaces are processed (or coated) with an organic compound having a carboxylic acid group, an ester group or an acyl group; particles whose surfaces are processed (or coated) with a complex compound containing halogen (F, Cl, Br or I) elements; particles whose surfaces are processed (or coated) with a coordination compound containing amine, thiol or phosphine; and particles having electric charges generated by forming radicals on the surfaces.

Meanwhile, in order for the color-generating particles to effectively exhibit photonic crystal characteristics by maintaining a stable colloidal state without precipitation in a solvent, the value of the electrokinetic potential (i.e., zeta potential) of the colloidal solution (comprising the particles and a solvent) may be greater than or equal to a preset value. For example, the absolute value of the electrokinetic potential of the colloidal solution may be more than or equal to 10 mV. In addition, the difference in specific gravity between the particles and the solvent may be less than or equal to a preset value, for example, less than or equal to 5. Furthermore, the difference in refractive index between the solvent and the particles may be greater than or equal to a preset value, for example, more than or equal to 0.3.

Further, if the color-generating particles have electrical polarization characteristics, the particles may include a material which is electrically polarized with any one of electronic polarization, ionic polarization, interfacial polarization or rotational polarization due to asymmetrical charge distribution of atoms or molecules as an external electric field is applied.

Moreover, the color-generating particles may include a ferroelectric material, which shows an increase in polarization upon application of an external electric field and shows a large remnant polarization and remnant hysteresis even without the application of an external electric field. Alternatively, the color-generating particles may include a superparaelectric material, which shows an increase in polarization upon application of an external electric field and shows no remnant polarization and no remnant hysteresis when no external electric field is applied.

Further, the color-generating particles may include a material having a perovskite structure. Examples of materials having a perovskite structure, such as $ABO_3$, may include materials such as $PbZrO_3$, $PbTiO_3$, $Pb(Zr,Ti)O_3$, $SrTiO_3$, $BaTiO_3$, $(Ba, Sr)TiO_3$, $CaTiO_3$, $LiNbO_3$ or the like.

If the color-generating particles have electrical polarization characteristics, the solvent does not have to have electrical polarization characteristics. In this case, the solvent may be a dielectric solvent, examples of which include, but are not limited to, solvents having a low viscosity and a dielectric constant in the range of about 2 to about 30, preferably about 2 to about 15 for high particle mobility. Specific examples of suitable dielectric solvent may include hydrocarbons such as Isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluorobenzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow Corning (DC-200).

If the color-generating particles do not have electrical polarization characteristics, the solvent has to have electrical polarization characteristics, which may be created by methods/materials as described above for the color-generating particles. For example, the solvent may include a material which is electrically polarized with any one of electronic polarization, ionic polarization, interfacial polarization, or rotational polarization due to asymmetrical charge distribution of atoms or molecules as an external electric field is applied; or the solvent may include a ferroelectric material; or the solvent may include a superparaelectric material; or the solvent may include a material having a perovskite structure as described above; or the solvent may include a material having a polarity index of 1 or greater.

Examples of solvents having electrical polarization characteristics may include, but are not limited to, water, trichloroethylene, carbon tetrachloride, di-iso-propyl ether, toluene, methyl-t-butyl ether, xylene, benzene, diethyl ether, dichloromethane, 1,2-dichloroethane, butyl acetate, iso-propanol, n-butanol, tetrahydrofuran, n-propanol, chloroform, ethyl acetate, 2-butanone, dioxane, acetone, methanol, ethanol, acetonitrile, acetic acid, dimethylformamide, dimethyl sulfoxide and propylene carbonate.

The color-generating particles carrying the same charge polarity are dispersed in a solvent which has electrical polarization characteristics. When an electric field is applied to the dispersion, electrical attraction proportional to the intensity of the electric field and the charge amount of the particles, act on the particles due to the electric charges of the particles. As a result, the particles move in a predetermined direction by electrophoresis, thus narrowing the inter-particle distances. In contrast, electrical repulsion generated between the particles having the electric charges of the same polarity increases as the inter-particle distances become smaller resulting in a predetermined equilibrium state while preventing the inter-particle distances from continuing to decrease.

Further, the solvent is electrically polarized in a predetermined direction due to the electrical polarization characteristics of the solvent. Thus, electrical attraction is locally generated and exerts a predetermined effect upon the inter-particle distances between the particles electrically interacting with the polarized solvent. That is, the color-generating particles can be regularly arranged at distances where electrical attraction induced by an external electric field, electrical repulsion between the particles having electric charges of the same polarity and electrical attraction induced by polarization, are in equilibrium. As a result, the inter-particle distances can be controlled at predetermined levels, and the particles arranged at predetermined distances can function as photonic crystals. Since the wavelength of light reflected from the regularly spaced particles is determined by the inter-particle distance, the wavelength of the light reflected from the particles can be arbitrarily controlled by controlling the inter-particle distances. Therefore, a pattern of the wavelength of reflected light may be diversely represented by the factors, such as the intensity and direction of the applied electric field, the size and mass of the particles, the refractive indices of the particles and the solvent, the charge amount of the particles, the electrical polarization characteristics of the solvent or the concentration of the particles dispersed in the solvent.

Alternatively, when the color-generating particles having both electric charges of the same polarity and electrical polarization characteristics are dispersed in a solvent and if an electric field is applied to the particles and the solvent, electrical attraction proportional to the intensity of the electric field and the charge amount of the particles act on the particles due to the electric charges of the particles. Therefore, the particles move in a predetermined direction by electrophoresis, thus narrowing the inter-particle distance. In contrast, electrical repulsion generated between the particles having the electric charges of the same polarity increases as the inter-particle distances decreases, thus reaching a predetermined equilibrium state while preventing the inter-particle distances from continuing to decrease. The particles are electrically polarized in a predetermined direction due to the electrical polarization characteristics of the particles. Thus, electrical attraction is locally generated between the polarized particles and exerts a predetermined effect upon the inter-particle distances.

As a result, the color-generating particles can be regularly arranged at a distance where electrical attraction induced by an external electric field, electrical repulsion between the particles having electric charges of the same polarity and electrical attraction induced by polarization, are in equilibrium. Accordingly, the inter-particle distances can be controlled at predetermined intervals, and the particles arranged at predetermined intervals can function as photonic crystals. Since the wavelength of light reflected from the regularly arranged color-generating particles is determined by the inter-particle distances, the wavelength of the light reflected from the particles can be accurately controlled by controlling the inter-particle distances. Therefore, a pattern of the wavelength of reflected light may be diversely represented by the factors, such as the intensity and direction of an electric field, the size and mass of the particles, the refractive indices of the particles and the solvent, the charge amount of the particles, the electrical polarization characteristics of the particles or the concentration of the particles dispersed in the solvent.

It is possible for both the color-generating particles and the solvent to have electrical polarization characteristics.

FIGS. 2-1 to 2-5 illustrate how different color states may be displayed by a display device of the present invention.

As shown, a display fluid comprises two types of electrophoretic particles, black (21) and white (22), and one type of color-generating particles (23). It is assumed that the black electrophoretic particles are positively charged and the white electrophoretic particles are negatively charged. The color-generating particles carry a positive charge and the charge level of the color-generating particles is lower than that of the charges carried by the black and white particles.

When a high positive driving voltage V2 is applied for a short period of time t2, the positively charged black particles are driven to the viewing side (i.e., the side of the common electrode). As a result, a black color is seen (FIG. 2a). The high driving voltage, in this case, is referred to as a driving voltage which is sufficiently high to drive the black particles to the viewing side during a short driving time (i.e., t2). Such a driving voltage may be +15V, as an example. The short driving time t2 is usually less than 500 msec.

When a high negative driving voltage V1 is applied for a short period of time t1, the negatively charged white particles are driven to the viewing side. As a result, a white color is seen (FIG. 2b). The high driving voltage, in this case, is referred to as a driving voltage which is sufficiently high to drive the white particles to the viewing side during a short driving time, t1. Such a driving voltage may be −15V, as an example. The short driving time is usually also less than 500 msec.

In FIGS. 2a and 2b, because the color-generating particles are lesser charged and the driving times are short, the color-generating particles remain scattered in the display fluid.

If a negative driving voltage V3 is applied to the fluid in FIG. 2a for a period of time, t3, which driving voltage and the driving time are not sufficient to drive a pixel to the white color state of FIG. 2b, and instead, the white and black particles are driven to the middle of the pixel as shown in FIG. 2c, the color seen would be the color (i.e., a first color state) of the color-generating particles.

Similarly, if a positive driving voltage V4 is applied to the fluid in FIG. 2b for a period of time, t4, which driving voltage and the driving time are not sufficient to drive a pixel to the black color state of FIG. 2a, and instead, the white and black particles are driven to gather in the middle of the pixel as shown in FIG. 2d, the color seen would also be the color of the color-generating particles.

The brightness of the color of the color-generating particles can be adjusted by controlling locations of the black and white particles and mixing levels through magnitude of driving voltages V3 and V4 and/or driving times, t3 and t4. The magnitude of driving voltages V3 and V4, in this case, may be higher than, or equal to, 10V. The driving times, t3 and t4, may be the same as t1 and t2, but in this case, they are preferably shorter than t1 and t2.

When a low positive driving voltage V5 is applied to the fluid in FIG. 2c and the voltage is applied for a relatively long period of time, t5, an external electric field created between the common electrode and the pixel electrode would alter the spatial distances between the color-generating particles. As a result, the color-generating particles would reflect light of a different wavelength (i.e., a second color state of FIG. 2e), according to the applied voltage. The color or the reflective light spectrum from color-generating particles is adjustable by driving voltage V5 and it continuously changes with the change of the driving voltage. Usually with higher driving voltage, the spectrum of reflective light shifts from low frequency to high frequency range. The reflective light band may cover not only the range of visible light but also the infrared and ultraviolet light ranges. The low driving voltage V5, in this case, is usually lower than V1 and V2, because of which the black and white particles in this scenario remain substantially unmoved. V5 may be less than, or equal to, +5V, as an example. The time period, t5, is usually longer than t1 and t2.

The same phenomenon may also be achieved with V6 applied to the fluid of FIG. 2c for a relatively long period of time, t6, to generate a third color state of a different wavelength (see FIG. 2f).

When a voltage of V7 is applied to the fluid of FIG. 2e for a period of time, t7, a third color state may be displayed (see FIG. 2f).

The driving voltages V6 and V7 are lower than V1 and V2 and the time periods t6 and t7 are longer than t1 and t2.

Figures 1, 2:
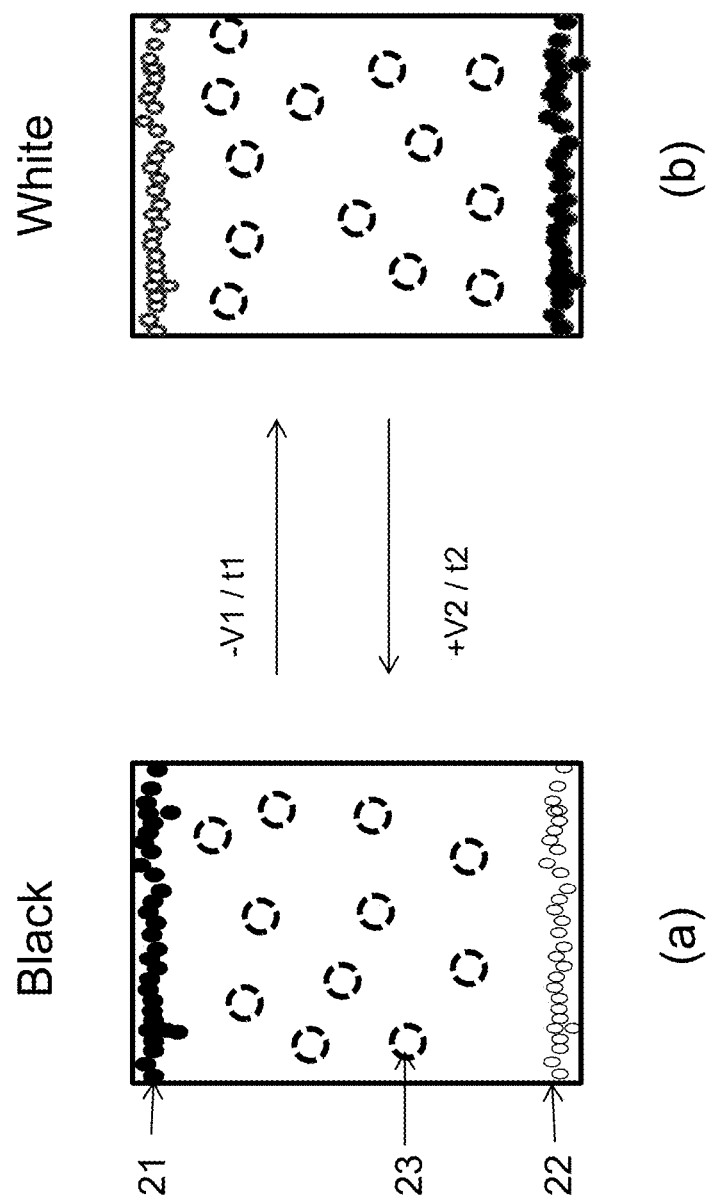
Figure 2:
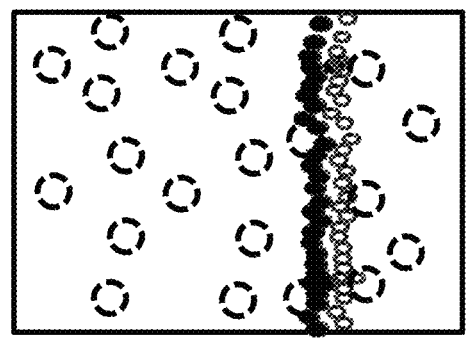
Figure 2:
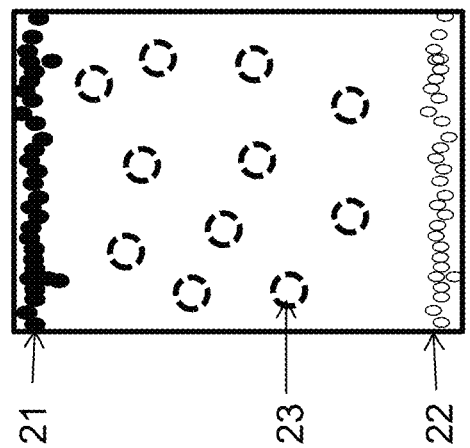

The phenomenon illustrated in FIG. 2 for the fluid of (c), (e) and (f) can be similarly applied to the fluid of (d), (e) and (f), with driving voltages, V8, V9 and V10 and driving times, t8, t9 and t10, respectively. For example, V8, V9 and V10 are usually lower than V1 and V2 and the time periods t8, t9 and t10 are longer than t1 and t2. The driving voltages and driving times, V5-V7 and t5-t7, may be the same or different from the driving voltages and driving times, V8-V10 and t8-t10.

The colors referred to in the drawings, a first color, a second color and a third color, may be red, green and blue, respectively. However, this is in no way limiting the scope of the present invention. It is noted that each of the pixels in the present color display device may display an unlimited number of color states, because when different external electric fields are applied, they would cause the color-generating particles to reflect light of different wavelengths.

As stated above, the brightness of the color of the color-generating particles can be adjusted by controlling the locations and mixing levels of the black and white particles. This is shown in FIGS. 3 and 4, respectively.

Figures 2, 3:
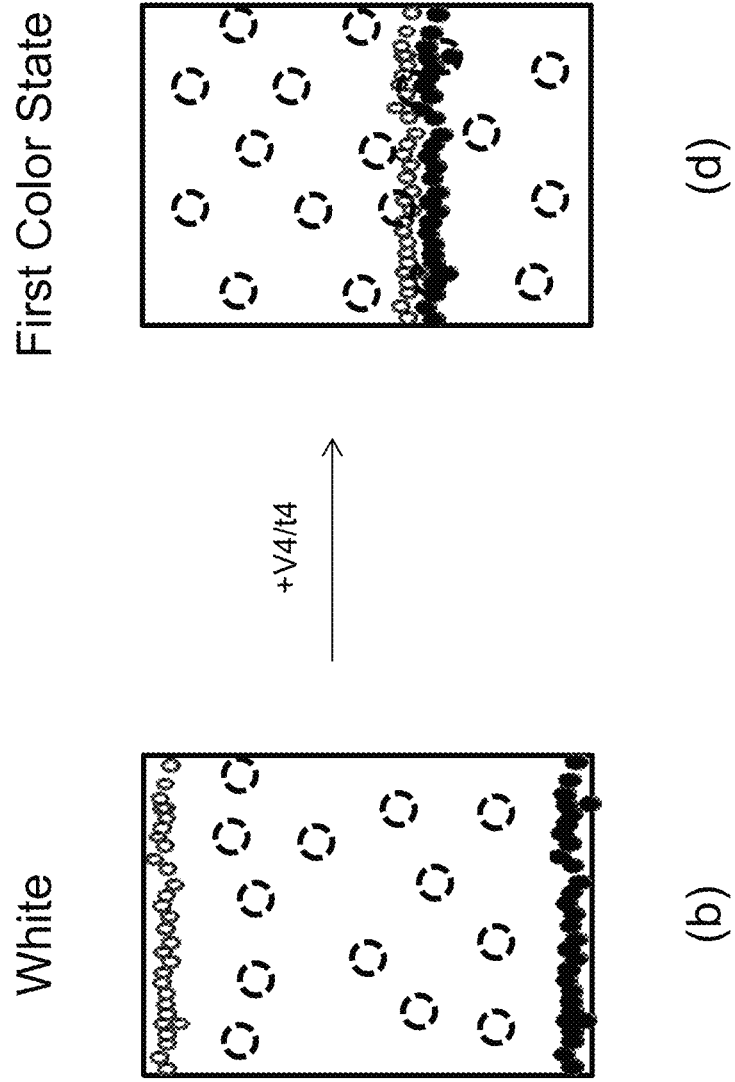

In FIG. 3, pixel (a) has the highest brightness of the color generated by the color-generating particles as the white particles are on top of the black particles and are the closest to the viewing side. Pixels (b) and (c) have brightness lower than pixel (a). Pixel (d) is darker than pixel (c) as in pixel (d), the black particles are on top of the white particles. Pixel (f) has the lowest brightness because the black particles are closest to the viewing side.

Figures 2, 3, 4:
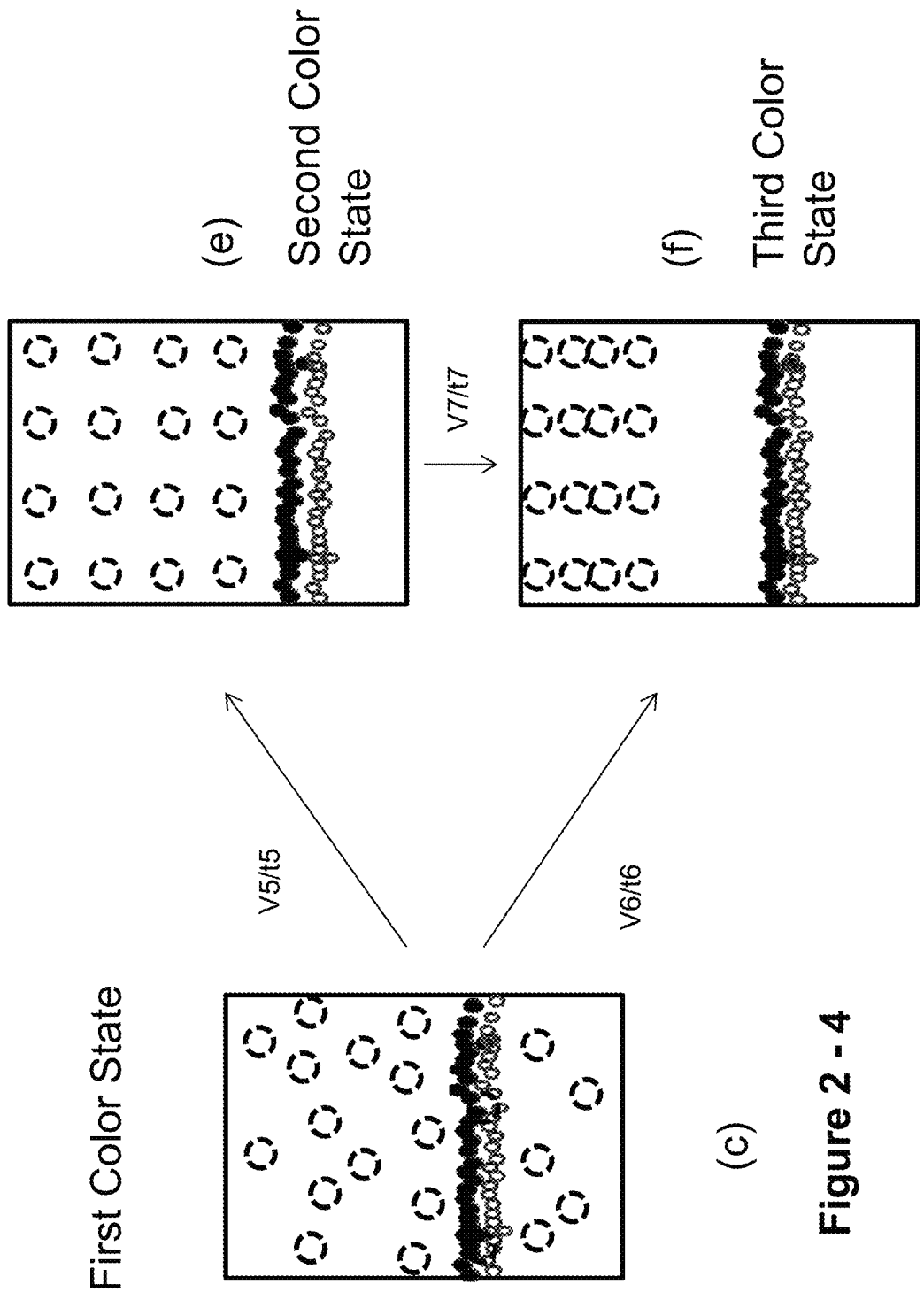
Figures 2, 3, 4, 5:
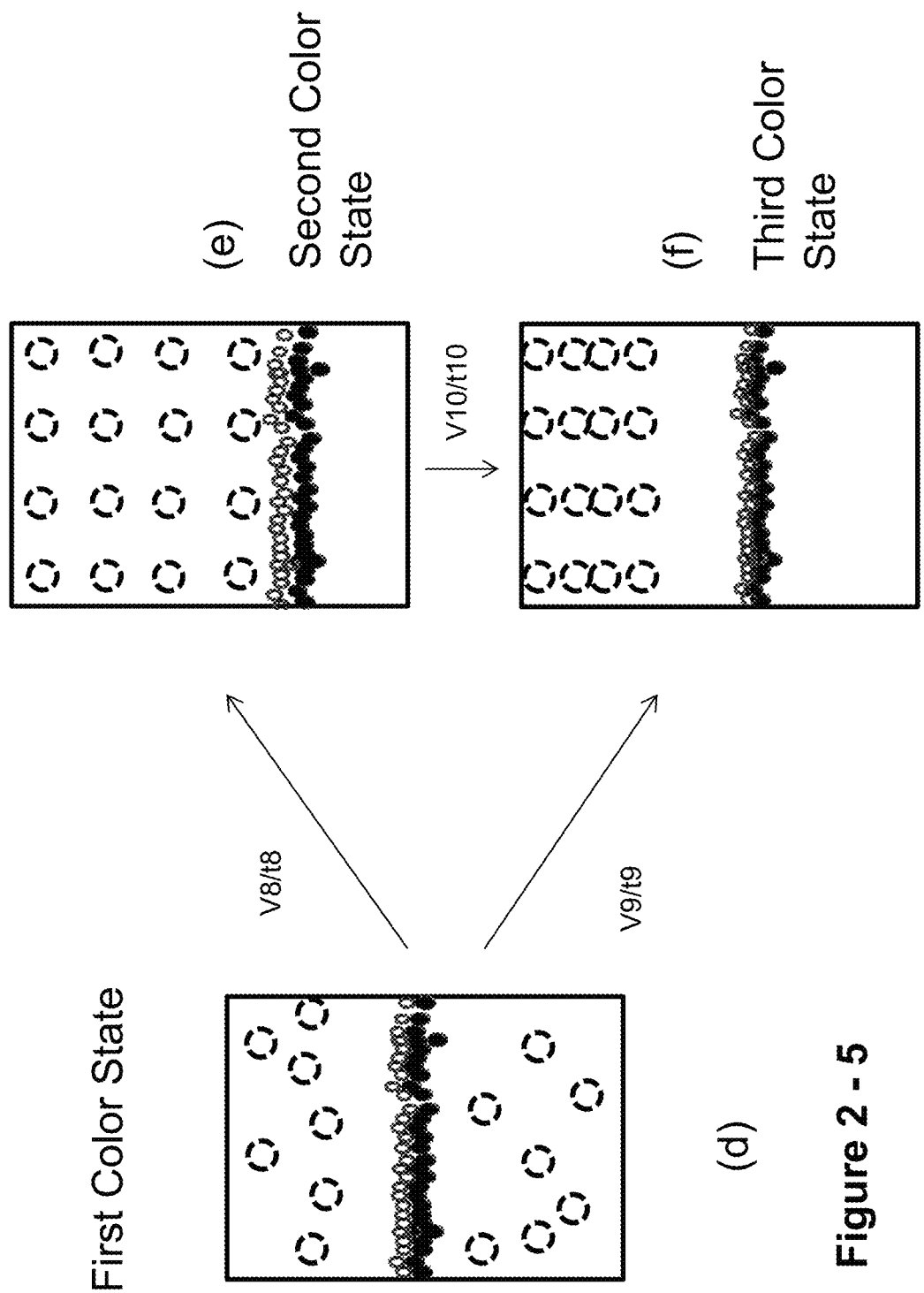
Figure 4:
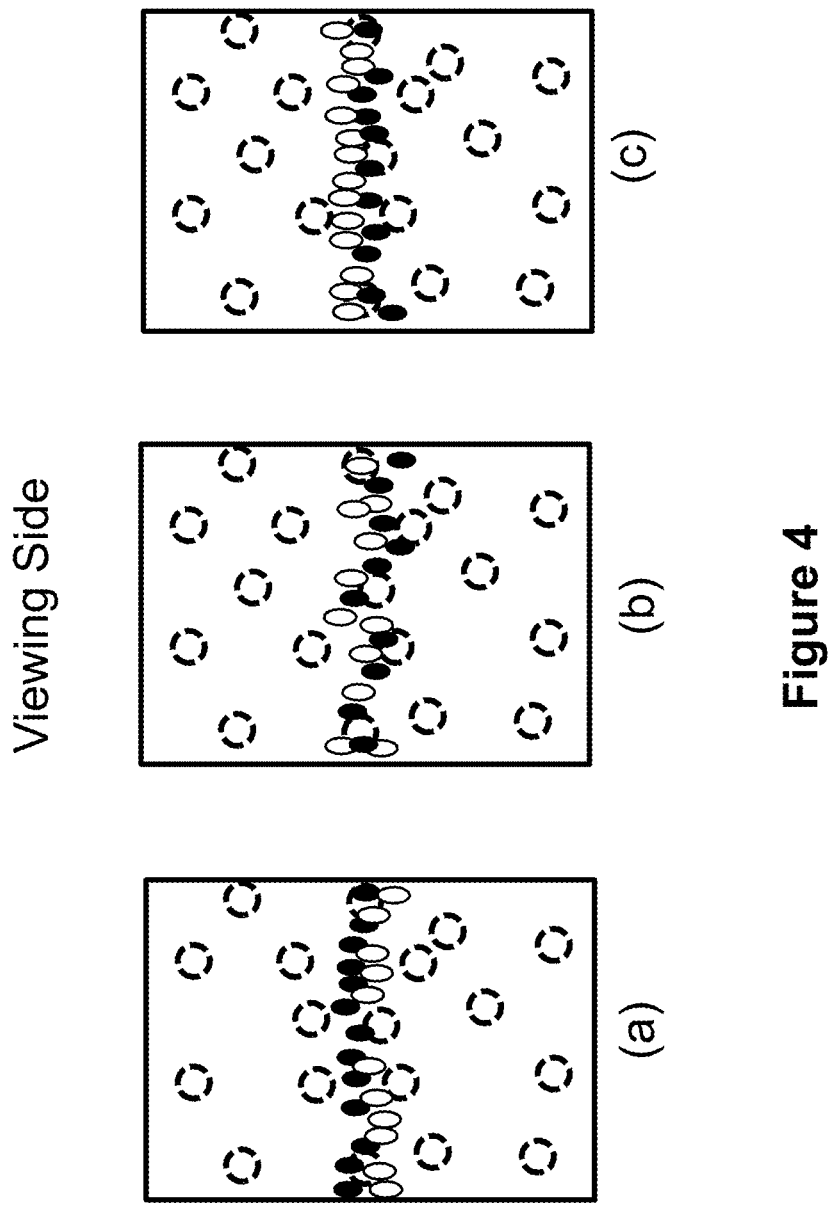

FIG. 4 shows how different mixing levels of the black and white particles influence the brightness of the color generated by the color-generating particles. In pixel (a), there are more black particles than the white particles facing the viewing side and therefore that pixel is darker than the other pixels. In pixel (c), there are more white particles than the black particles facing the viewing side and therefore that pixel is brighter. In pixel (b), the black and white particles are more evenly distributed which causes the color intensity between pixel (a) and pixel (c).

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A method for displaying colors, the method comprising:
providing a layer of a display fluid, the layer having a viewing surface, the display fluid comprising first electrophoretic particles bearing a charge of one polarity, second electrophoretic particles bearing a charge of the opposite polarity, one of the first and second particles being white and the other black, and charged third particles bearing a charge of the same polarity as the first particles, the third particles having photonic crystal characteristics in as much as the wavelength of light reflected from a grouping of the third particles varies with the distance between the particles, the first, second and third particles all being dispersed in a solvent or solvent mixture, the method comprising:
(i) applying a first electric field having a high magnitude and a polarity driving the first particles towards the viewing surface, thereby causing the color of the first particles to be displayed at the viewing surface;
(ii) applying a second electric field having a high magnitude and a polarity driving the second particles towards the viewing surface, thereby causing the color of the second particles to be displayed at the viewing surface;

(iii) when the color of the second particles is displayed at the viewing surface, applying a third electric field having the same polarity as, but a lower magnitude than, the first electric field, thereby causing the color of the dispersed third particles to be displayed at the viewing surface; and (iv) when the color of the dispersed third particles is displayed at the viewing surface, applying a fourth electric field having the same polarity as the first and third electric fields, and a magnitude intermediate the magnitudes of the first and third electric fields, thereby causing to be displayed at the viewing surface a fourth color which is different from all of black, white and the color of the dispersed third particles.

2. The method of claim 1 wherein, when the color of the first particles is displayed at the viewing surface, applying a fifth electric field having the same polarity as, but a lower magnitude than, the second electric field, thereby causing the color of the dispersed third particles to be displayed at the viewing surface.

3. The method of claim 1 wherein, when the fourth color is displayed at the viewing surface, applying a color-changing electric field having the same polarity as the first and fourth electric fields, and a magnitude intermediate the magnitude of the first and fourth electric fields, thereby causing to be displayed at the viewing surface a fifth color which is different from all of black, white, the color of the dispersed third particles, and the fourth color.

4. The method of claim 3 wherein the color of the dispersed third particles, the fourth color and the fifth color are red, green and blue respectively.

5. The method of claim 1 wherein the intensity of the colors displayed is controlled by adjusting locations of the black and white electrophoretic particles or mixing levels of the black and white particles.

6. A display device comprising a layer of a display fluid, the layer having a viewing surface, the display fluid comprising first electrophoretic particles bearing a charge of one polarity, second electrophoretic particles bearing a charge of the opposite polarity, one or the first and second particles being white and the other black, and charged third particles bearing a charge of the same polarity as the first particles, the third particles having photonic crystal characteristics in as much as the wavelength of light reflected from a grouping of the third particles varies with the distance between the particles, the first, second and third particles all being dispersed in a solvent or solvent mixture, and means for applying an electric field across the layer of the display fluid, the display device being characterized in that:

(i) applying a first electric field having a high magnitude and a polarity driving the first particles towards the viewing surface causes the color of the first particles to be displayed at the viewing surface;

(ii) applying a second electric field having a high magnitude and a polarity driving the second particles towards the viewing surface causes the color of the second particles to be displayed at the viewing surface;

(iii) when the color of the second particles is displayed at the viewing surface, applying a third electric field having the same polarity as, but a lower magnitude than, the first electric field causes the color of the dispersed third particles to be displayed at the viewing surface;

(iv) when the color of the dispersed third particles is displayed at the viewing surface, applying a fourth electric field having the same polarity as the first and third electric fields, and a magnitude intermediate the magnitudes of the first and third electric fields, causes to be displayed at the viewing surface a fourth color which is different from all of black, white and the color of the dispersed third particles.

7. The display device of claim 6 wherein the third particles have electrical polarization characteristics.

8. The display device of claim 6 wherein the solvent or solvent mixture has electrical polarization characteristics.

9. The display device of claim 6 wherein both the third particles and the solvent or solvent mixture have electrical polarization characteristics.

10. The display device of claim 6 wherein the third particles are formed of silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), or a compound thereof.

11. The display device of claim 6 wherein the third particles are formed of polymer materials such as PS (polystyrene), PE (polyethylene), PP (polypropylene), PVC (polyvinyl chloride), or PET (polyethylene terephthalate).

12. The display device of claim 6 wherein the third particles are formed by coating particles or a cluster having no electric charge with a material having electric charges.

13. The display device of claim 7 wherein the third particles include a material which is electrically polarized with any one of electronic polarization, ionic polarization, interfacial polarization or rotational polarization due to asymmetrical charge distribution of atoms or molecules as an external electric field is applied.

14. The display device of claim 6 wherein the third particles include a ferroelectric material.

15. The display device of claim 6 wherein the third particles include a superparaelectric material.

16. The display device of claim 6 wherein the third particles include a material having a perovskite structure.

17. The display device of claim 6 wherein the solvent is water, trichloroethylene, carbon tetrachloride, di-iso-propyl ether, toluene, methyl-t-butyl ether, xylene, benzene, diethyl ether, dichloromethane, 1,2-dichloroethane, butyl acetate, iso-propanol, n-butanol, tetrahydrofuran, n-propanol, chloroform, ethyl acetate, 2-butanone, dioxane, acetone, methanol, ethanol, acetonitrile, acetic acid, dimethylformamide, dimethyl sulfoxide or propylene carbonate.

* * * * *